(12) United States Patent
Washiya et al.

(10) Patent No.: US 8,560,878 B2
(45) Date of Patent: Oct. 15, 2013

(54) SYSTEM AND METHOD FOR FAILURE DETECTION BY A STORAGE EXPANDER PRECEDING AN EXPANDER EXPERIENCING A FAILURE

(75) Inventors: Koji Washiya, Odawara (JP); Tsutomu Koga, Matsuda (JP); Nobuyuki Minowa, Oi (JP)

(73) Assignee: Hitachi, Ltd., Tokyo (JP)

( * ) Notice: Subject to any disclaimer, the term of this patent is extended or adjusted under 35 U.S.C. 154(b) by 199 days.

(21) Appl. No.: 13/122,695

(22) PCT Filed: Mar. 23, 2011

(86) PCT No.: PCT/JP2011/001685
§ 371 (c)(1),
(2), (4) Date: Apr. 5, 2011

(87) PCT Pub. No.: WO2012/127529
PCT Pub. Date: Sep. 27, 2012

(65) Prior Publication Data
US 2012/0246521 A1   Sep. 27, 2012

(51) Int. Cl.
*G06F 11/00*   (2006.01)
*G06F 11/22*   (2006.01)

(52) U.S. Cl.
USPC ............................. 714/5.11; 714/6.21; 714/43

(58) Field of Classification Search
USPC ......................................... 714/5.11, 6.21, 43
See application file for complete search history.

(56) References Cited

U.S. PATENT DOCUMENTS

| | | | |
|---|---|---|---|
| 7,360,119 B1 * | 4/2008 | Stenfort et al. | 714/43 |
| 7,673,185 B2 * | 3/2010 | Kalwitz et al. | 714/43 |
| 7,809,983 B2 * | 10/2010 | Suzuki et al. | 714/14 |
| 8,051,334 B2 * | 11/2011 | Jones et al. | 714/43 |
| 8,307,157 B2 * | 11/2012 | Sakuma et al. | 711/114 |
| 2007/0070885 A1 | 3/2007 | Uddenberg et al. | |
| 2008/0010530 A1 | 1/2008 | Davies et al. | |
| 2008/0244098 A1 * | 10/2008 | Oikawa et al. | 710/5 |
| 2008/0244139 A1 * | 10/2008 | Nakajima | 710/300 |
| 2011/0191644 A1 * | 8/2011 | Oldfield et al. | 714/704 |
| 2011/0302368 A1 * | 12/2011 | Mimata et al. | 711/114 |
| 2012/0233399 A1 * | 9/2012 | Kurokawa et al. | 711/114 |

FOREIGN PATENT DOCUMENTS

| | | |
|---|---|---|
| JP | 2009-540436 | 11/2009 |
| WO | WO 2007/146515 A2 | 12/2007 |

OTHER PUBLICATIONS

American National Standard for Information Technology—Serial Attached SCSI-2 (SAS-2); INCITS 457-2010; American National Standards Institute, Inc. Mar. 24, 2010; pp. i-xlii; 1-877.
Look-Ahead State Machine Algorithm for Protocol Improvement in a Communication System; IBM Technical Disclosure Bulletin, vol. 37, No. 11; Nov. 1994; pp. 287-289.
PCT International Search Report and Written Opinion on application No. PCT/JP2011/001685 mailed Aug. 3, 2011; 13 pages.

* cited by examiner

*Primary Examiner* — Joseph Schell
(74) *Attorney, Agent, or Firm* — Foley & Lardner LLP

(57) ABSTRACT

Reduction of data processing capacity attributable to the occurrence of a failure is prevented by promptly identifying the failure location.
A storage apparatus includes a plurality of expanders connected to storage media storing data sent from a host system, and a controller for controlling the expanders, wherein the controller sends a failure detection command to the plurality of expanders; the plurality of expanders store the command in their own storage units; and if one expander from among the plurality of expanders detects a failure in another expander immediately following and connected to the one expander, the one expander reads the command stored in a storage unit for the one expander and sends a response including failure detection information corresponding to the command to the controller.

9 Claims, 17 Drawing Sheets

FIG. 6

| DEVICE ID | SAS ADDRESS | VALID |
|---|---|---|
| 1 | 0x00000001 | 1 |
| 2 | 0x00000002 | 1 |
| 3 | 0x00000003 | 1 |
| 4 | 0x00000004 | 1 |
| 5 | 0x00000005 | 1 |
| 6 | 0x00000006 | 1 |

| PHY NUMBER | SAS ADDRESS | VALID |
|---|---|---|
| 1 | 0x00000001 | 1 |
| 2 | 0x00000002 | 1 |
| 3 | 0x00000003 | 1 |
| 4 | 0x00000004 | 1 |
| 5 | 0x00000005 | 1 |

114

1141  1142  1143

SYSTEM AND METHOD FOR FAILURE
DETECTION BY A STORAGE EXPANDER
PRECEDING AN EXPANDER
EXPERIENCING A FAILURE

TECHNICAL FIELD

The present invention relates to a storage apparatus and a failure detection method and is suited for use in a storage apparatus and failure detection method that make it easier to detect a failure in a storage device.

BACKGROUND ART

As an example of a storage system, there is a storage system in which a daisy chain connection is established, via expanders, between a plurality of storage units (storage devices) such as hard disk drives (HDD) and a control device for controlling the plurality of storage units (for example, Patent Literature 1). With such a storage system, a communication protocol such as a SAS (Serial Attached SCSI) is used in order to perform peer-to-peer communication between the control device and the storage units.

A storage system which uses the SAS as the above-mentioned communication protocol is configured so that a plurality of SAS expanders are connected serially to a SAS controller in a control device and the plurality of storage devices are connected to each SAS expander. According to a standard specification of the SAS (Non-patent Literature 1), if a link failure such as communication incapability occurs in a SAS expander, another SAS expander immediately followed by the above-mentioned SAS expander notifies the SAS controller of a change in the configuration of the immediately following SAS expander. However, the storage system is designed so that the SAS controller cannot identify, with that notice, which SAS expander has sent the above-mentioned notice. So, the SAS controller which has received the notice from the SAS expander sends a confirmation command to the SAS expander in order to identify at which location the failure occurred. Then, the SAS controller identifies at which location the link failure occurred, based on a response result from the SAS expander.

CITATION LIST

Patent Literature

PTL 1: Japanese Patent Laid-Open (Kohyo) Application Publication No. 2009-540436

Non Patent Literature

NPL 1: Serial Attached SCSI-2 (SAS-2), Apr. 18, 2009, revision 16, project T10/1760-D<//http://www.t10.org/drafts.htm/sas2r16.pdf)>

SUMMARY OF INVENTION

Technical Problem

However, if the location where the link failure occurred is to be identified by the above-described method, a command (s) to the SAS controller where the failure occurred remains in a command queue in the SAS controller. So, there is a problem of considerable time required until the confirmation command for identifying the failure occurrence location is sent to the SAS expander.

The present invention was devised in consideration of the above-described circumstances and aims at suggesting a storage apparatus and failure detection method capable of promptly identifying a failure location.

Solution to Problem

In order to solve the above-described problem, a storage apparatus including a plurality of expanders connected to storage media for storing data sent from a host system, and a controller for controlling the expanders is provided according to the present invention, wherein the controller sends a failure detection command to the plurality of expanders and the plurality of expanders store the command in their own storage units; and wherein if one expander from among the plurality of expanders detects a failure in another expander immediately following and connected to the one expander, the one expander reads the command stored in the storage unit for the one expander and sends a response including failure detection information corresponding to the command to the controller.

When the above-described configuration is employed, and if a failure detection command is stored in each expander in advance and an expander detects a failure in another expander immediately following thereto, the expander reads the previously stored command and sends a response to the command to the controller. As a result, it is possible to reduce the length of time required to identify the failure location after the occurrence of the link failure in the expander, promptly cancel a command(s) to the storage media connected to the expander, where the failure occurred, and prevent reduction of data processing capacity attributable to the occurrence of the failure.

Advantageous Effects of Invention

According to the present invention, it is possible to prevent reduction of data processing capacity attributable to the occurrence of a failure by promptly identifying the failure location.

BRIEF DESCRIPTION OF DRAWINGS

FIG. 6 is a chart showing the content of a device management table according to the embodiment.

FIG. 10 is a chart showing the content of an address table according to the embodiment.

DESCRIPTION OF EMBODIMENTS

An embodiment of the present invention will be described in detail with reference to the attached drawings.

(1) Outline of this Embodiment

Firstly, the outline of this embodiment will be explained with reference to FIG. 1 and FIG. 2. The SAS exists as an interface between a control device and storage units in a storage apparatus. The SAS has devices for performing data transfer, for example, end devices such as control devices which are transfer sources, and storage units which are transfer destinations, and expander devices for relaying data transfer between these end devices. In this embodiment, the expander devices for performing data transfer according to SAS standards will be referred to as SAS expanders. A controller in the control device for controlling the SAS expanders will be referred to as a SAS controller.

Figure 1:
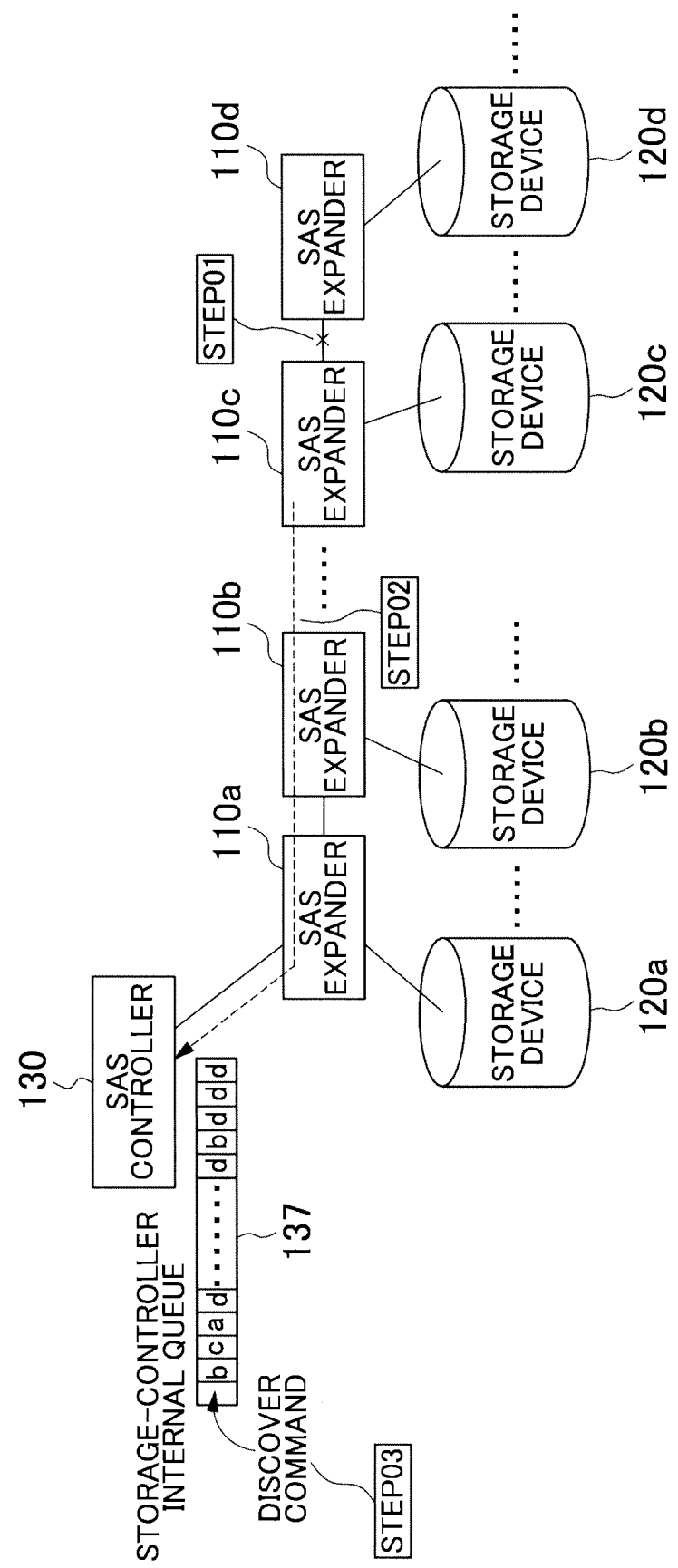
FIG. 1 is a conceptual diagram explaining the outline of an embodiment of the present invention.

A storage system using the SAS is configured as shown in FIG. 1 so that a plurality of SAS expanders 110a, 110b, 110c, 110d (hereinafter sometimes referred to as the SAS expander 110) are connected serially to a SAS controller 130 in a control device and a plurality of storage devices 120 are connected to the SAS expanders 110, respectively. If a link failure such as communication incapability occurs in the SAS expander 110d as shown in FIG. 1 (STEP01), the SAS expander 110c immediately followed by the expander 110d reports to the SAS controller 130 by means of a broadcast change command that there has been a change in the configuration of the immediately following SAS expander (STEP02). However, since the broadcast change reported in STEP02 is a primitive command, the SAS controller 130 cannot identify from which SAS expander 110 the report has been sent.

The SAS controller 130 which has received the report from the SAS expander 110c sends a confirmation command (discover command) for identifying at which location the link failure occurred, to the SAS expander 110a, the SAS expander 110b, the SAS expander 110c, and the SAS expander 110d (STEP03). Then, the SAS controller 130 identifies at which location the link failure occurred, based on the response result from the SAS expander 110.

However, if the location where the link failure occurred is to be identified by the above-described method, commands to the storage devices connected to the SAS expander 110d where the failure occurred remains in a command queue in the SAS controller 130 and, therefore, there is a problem of considerable time required until the confirmation command for identifying the failure occurrence location is sent to the SAS expander 110.

For example, commands to the storage devices 120a, 120b, 120c, and 120d (hereinafter sometimes referred to as the storage device(s) 120) in a command queue 137 in the SAS controller 130 as shown in FIG. 1. Referring to FIG. 1, a represents a command to the storage device 120a, b represents a command to the storage device 120b, c represents a command to the storage device 120c, and d represents a command to the storage device 120d.

For example, if commands to the storage device 120d, where a failure occurred, remains in the command queue 137, they are discarded after the elapse of a certain period of time (for example, after 150 milliseconds). Accordingly, it takes time for the SAS controller 130 to actually send the confirmation command after storing the discover command in the command queue 137 in STEP03, so that the failure occurrence location cannot be identified promptly. Furthermore, if the plurality of storage devices 120 are connected to the SAS expander 110, not only considerable time is required to discard the commands, but also there is a possibility that a specified time limit may expire while commands to the normal storage devices 120a, 120b, 120c may continue to be stored and kept in the command queue 137.

So, this embodiment is designed so that the confirmation command for identifying the location where a link failure has occurred is stored in all the SAS expander 110 in advance; and if the occurrence of a failure in a SAS expander immediately following the SAS expander 110 is detected, a response is made to the previously stored confirmation command. As a result, it is possible to prevent a delay in reception of the response result due to a delay in transmission of the confirmation command stored in the command queue 137 of the SAS controller 130 and promptly identify the failure occurrence location.

Figure 2:
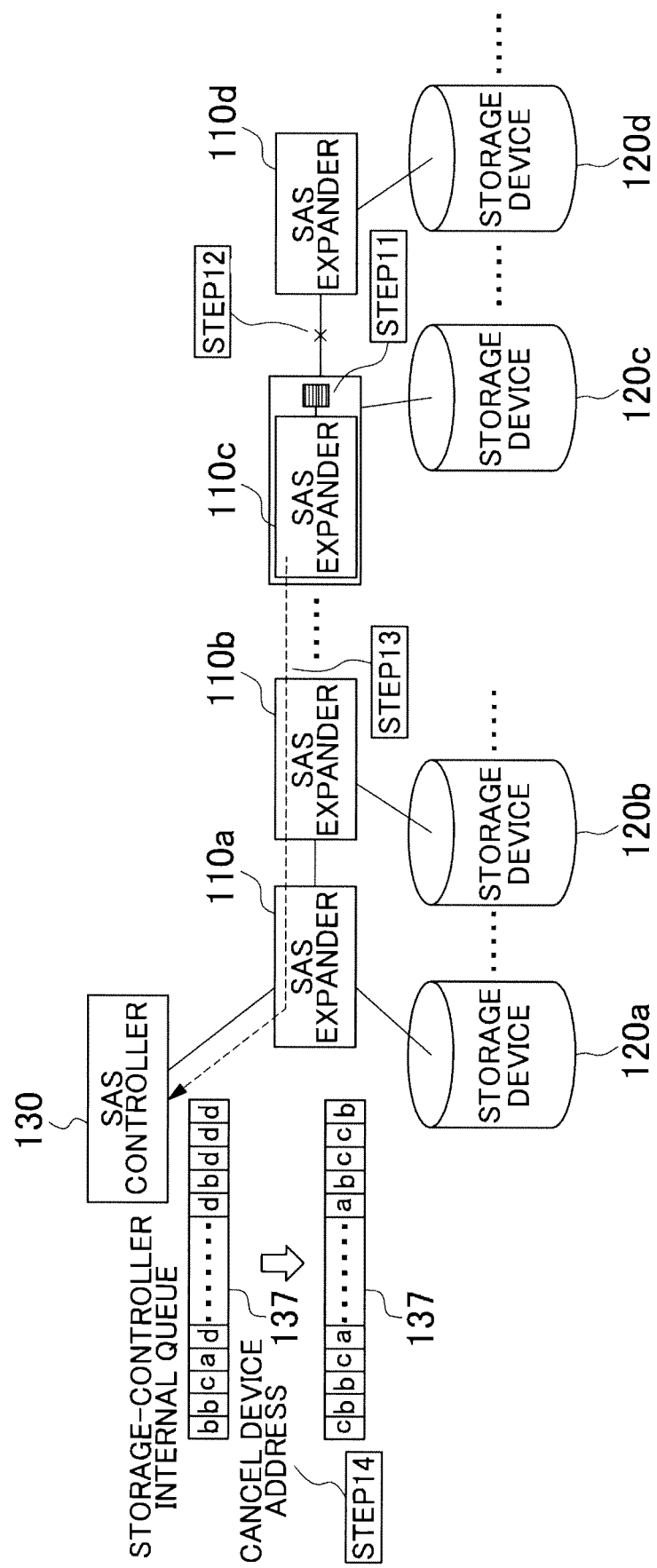
FIG. 2 is a conceptual diagram explaining the outline of the embodiment.

Specifically, after the system is started, the SAS controller 130 firstly sends the confirmation command to the SAS expanders 110a, 110b, 110c, and 110d and the confirmation command is stored in a memory for each SAS expander 110 (STEP11) as shown in FIG. 2. Then, if a link failure such as communication incapacity occurs in the SAS expander 110d (STEP01), configuration information about the SAS expander 110c changes and the confirmation command stored in the memory for the SAS expander 110c is executed as triggered by the change of the configuration information. A response result is then sent from the SAS expander 110c to the SAS controller 130 (STEP13). The SAS controller 130 identifies the SAS expander 110d where the link failure occurred, based on the response result sent in STEP13. Subsequently, the SAS controller 130 cancels device access d to the commands to the storage device 120d, where the failure occurred, from among the commands in the command queue 137 (STEP14).

In this way, reduction of the data processing capacity attributable to the failure occurrence can be prevented according to this embodiment by reducing the length of time required to identify the failure location after the occurrence of the link failure in the SAS expander 110d and promptly cancelling the commands to the storage device connected to the SAS expander 110 where the failure occurred.

(2) Configuration of Computer System

Figure 3:
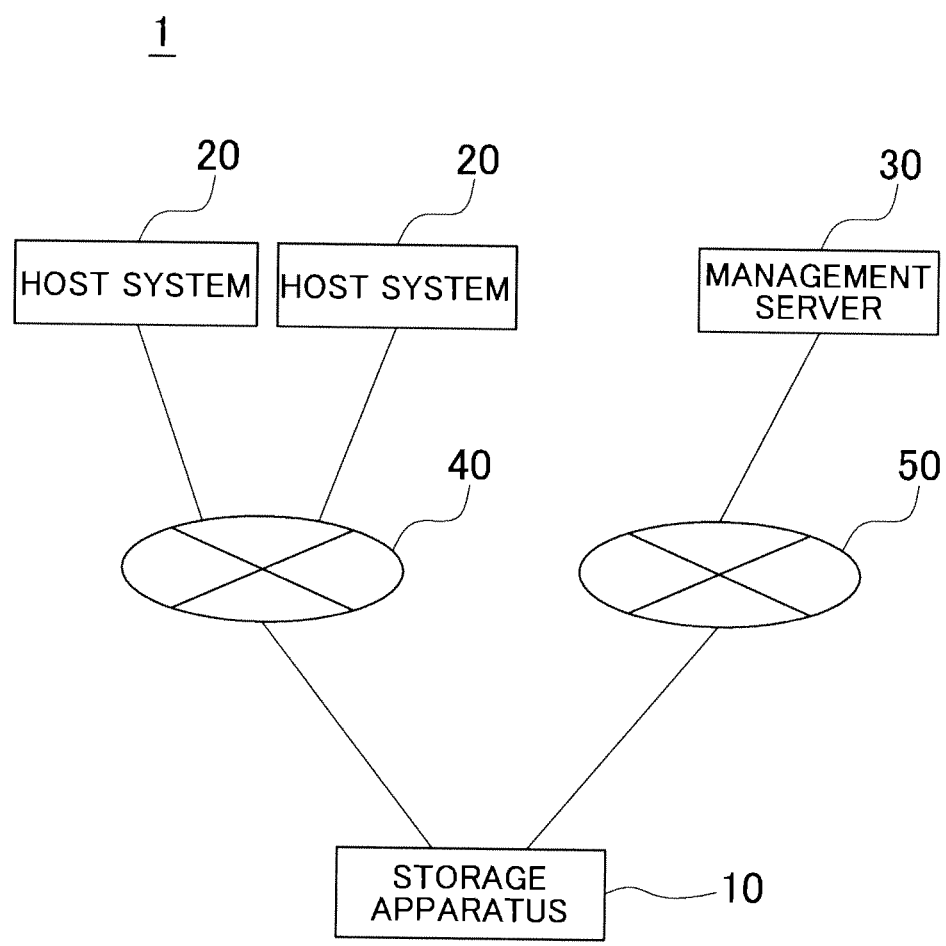
FIG. 3 is a block diagram showing the configuration of a computer system according to the embodiment.

Next, the configuration of a computer system 1 according to this embodiment will be explained. The computer system 1 includes a storage apparatus 10, host systems 20, a management server 30, a SAN (Storage Area Network) 40, and a LAN (Local Area Network) 50 as shown in FIG. 3.

The storage apparatus 10 is composed of, for example, information processing resources such as a CPU and a memory, as well as a plurality of storage media. Moreover, the storage apparatus 10 interprets a command sent from the host 20 via the network 40 and executes data input to, or output from, the storage media.

The host system 20 is a computer device equipped with information processing resources as a CPU (Central Processing Unit) and a memory and is composed of, for example, a personal computer, a workstation, or a mainframe. The host system 20 includes information input devices (not shown in the drawing) such as a keyboard, a switch, a pointing device, and/or a microphone, and information output devices (not shown in the drawing) such as a monitor display and a speaker and is connected via the SAN 40 to the storage apparatus 10.

The management server 30 is composed of a computer such as a personal computer, a workstation, or a portable information terminal and is connected via the LAN 50 to the storage apparatus 10. The management server 30 includes a display device for displaying a GUI (Graphical User Interface) for setting various settings to the storage apparatus 10 and various information, input devices such as a keyboard and a mouse for an operator to perform various operations and input various settings, and a communication device to communicate with the storage apparatus 10 via the LAN 50, and manages, for example, the storage apparatus 10 as input by, for example, the operator.

(3) Configuration of Storage Apparatus

Figure 4:
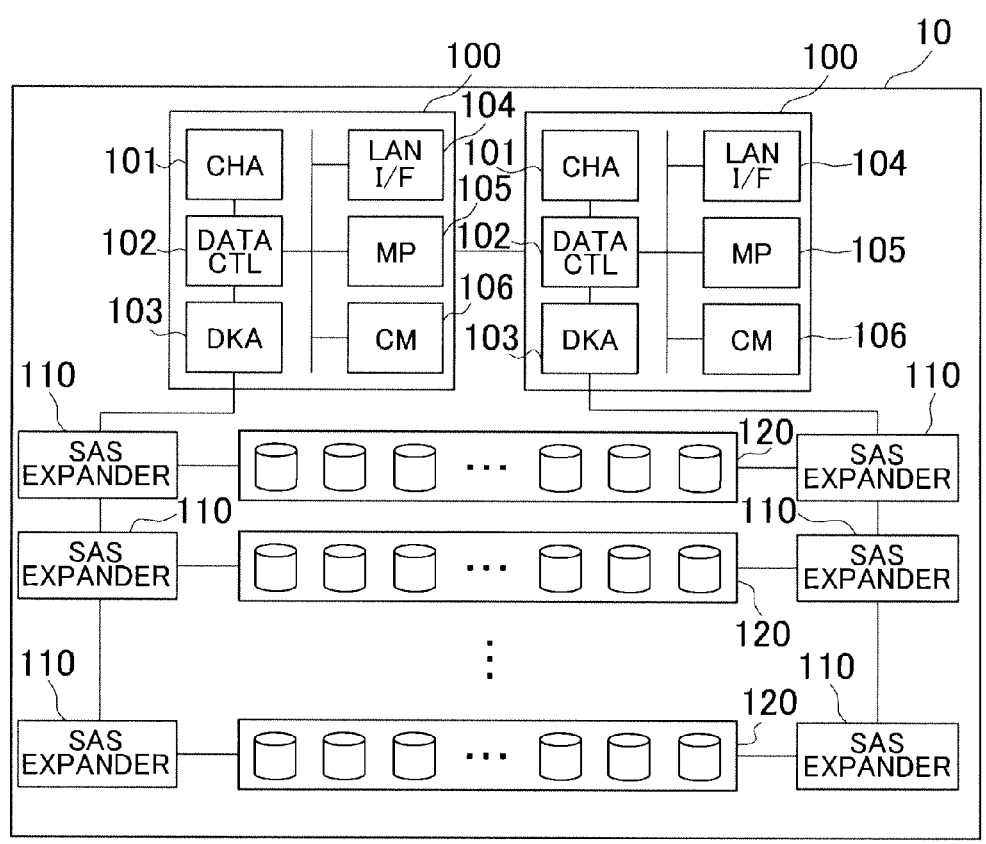
FIG. 4 is a block diagram showing the configuration of a storage apparatus according to the embodiment.

Next, the configuration of the storage apparatus 10 will be explained. The storage apparatus 10 includes control units 100, the storage media (storage devices) 120, and the SAS expanders 110 for relaying data transfer between the control units 100 and the storage media 120 as shown in FIG. 4.

The control unit 100 includes, for example, a channel (referred to as CHA in the drawing) 101, a data controller (referred to as DATA CTL in the drawing) 102, a disk adapter (referred to as DKA in the drawing) 103, a LAN interface (referred to as LAN I/F in the drawing) 104, a microprocessor (referred to as MP in the drawing) 105, and a cache memory (referred to as CM).

The channel 101 has a function performing data transfer of commands received from the host system 20 and executes processing for converting the format of the commands. The data controller 102 has a function performing data transfer within the control unit 100 and transfers commands received by the channel 101 to the microprocessor 105 and transfers data processed by the microprocessor 105 to the disk adapter 103 and the cache memory 106. The disk adapter 103 has a function performing data transfer of commands issued via the SAS expander 110 to the storage media 120. Moreover, the disk adapter 103 has the SAS controller 130 for receiving commands transferred from the microprocessor 105 and controlling the SAS expanders 110, and LSI (Large Scale Integration) (not shown in the drawing) for storing data, which the SAS controller 130 has received from the SAS expander 110 described later, in the memory.

The LAN interface 104 serves as a communication interface when communicating with the management server 30; and executes processing for converting the format of data and commands sent to, or received from, the management server 30 via the LAN 50. The microprocessor 105 has a function controlling data input to, or output from, (write access or read access to) the storage media 120 in response to a data input/output request from the host system 20 and controls each part in the storage apparatus 10 by executing a microprogram stored in a memory (not shown in the drawing). The cache memory 106 has a function temporarily storing the processing result of, for example, data input/output processed by the microprocessor 105.

Furthermore, the control unit 100 and the SAS expander 110 in the storage apparatus 10 are configured in a redundant manner. In this embodiment, the control unit 100 and the SAS expander 110 have a duplex configuration; however, the invention is not limited to such an example and the control unit 100 and the SAS expander 110 may have a multiplex configuration. Two control units 100 are connected to each other via a switch (not shown in the drawing) and are configured so that, for example, commands and data are exchanged between the two control units 100.

The SAS expander 110 is a device expansion switch for connecting a plurality of storage media 120 to one SAS controller 130. This SAS expander 110 can expand to and connect to SAS expanders 110 in a tree structure topology. As a result, one SAS controller 130 can control many storage media 120 via a plurality of SAS expanders 110.

In this embodiment, a wide link is used to establish connection between the SAS controller 130 and the first SAS expander 110 directly connected to that SAS controller 130 and between the SAS expanders 110. As a result, the SAS controller 130 can access the plurality of storage media 120 at the same time via the wide link.

The storage media 120 are composed of SAS hard disk devices. The storage media 120 have two SSP (Synchronous Serial Port) target ports and these two SSP target ports are connected to different two duplex SAS expanders 110, respectively. Individual SAS addresses are assigned to these two SSP target ports. The storage media 120 are controlled by the SAS controller 130 according to a SCSI command.

Incidentally, there are a plurality of kinds of SAS hard disk devices with different link rates (link rates: 1.5 Gbps, 3 Gbps, 6 Gbps, 12 Gbps, and so on). The storage media 120 to be used in the storage apparatus 10 do not necessarily have to have the same link rate and a plurality of kinds of SAS hard disk devices with different link rates may coexist.

(3-1) Configuration of SAS Controller

Figure 5:
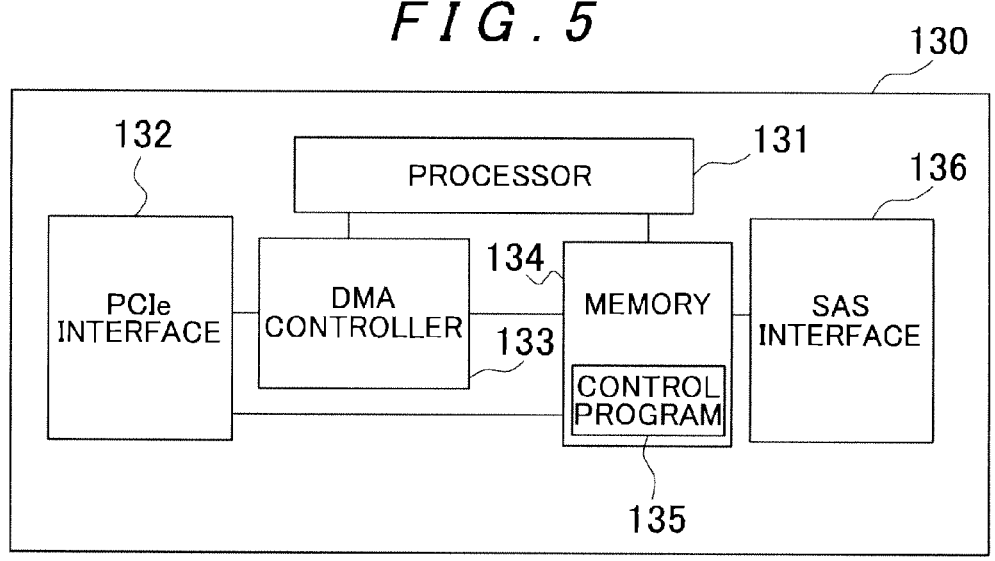
FIG. 5 is a block diagram showing the configuration of a SAS controller according to the embodiment.

Next, the configuration of the SAS controller 130 will be explained. The SAS controller 130 includes a processor 131, a PCIe (Peripheral Component Interconnect Express) interface 132, a DMA (Direct Memory Access) controller 133, a memory 134, and an SAS interface 136 as shown in FIG. 5.

The processor 131 has a function controlling the entire SAS controller 130, activates a control program 135 stored in the memory 134, and controls each part of the SAS controller 130. Also, the SAS controller 130 includes one or more SSP initiators for controlling SCSI (Small Computer System Interface) commands and one or more SMP (Serial Management Protocol) initiators for controlling commands to give instructions to the SAS expanders 110.

The PCIe interface 132 serves as a communication interface when communicating with the LSI connected at an upper level of the SAS controller 130 and executes processing for converting the format of data and commands sent from the LSI.

The DMA controller 133 controls data transfer between each device of the SAS controller and the memory 134. The memory 134 is used to retain, for example, the control program 135 and the control information and is also used to temporarily retain data transferred between the PCIe interface 132 and the processor 131 and between the SAS interface 136 and the processor 131.

The SAS interface 135 serves as a communication interface when communicating with the SAS expander 110, transfers data temporarily stored in the memory 134 to the SAS expander 110, and stores data, which is received from the SAS expander 110, in the memory 134.

Furthermore, a SAS address is assigned to each PHY described later of the SAS controller 130. The SAS address is a port identifier to designate a source port and a destination port when an initiator port of the SAS controller 130 according to each protocol performs frame transfer to a target port. A WWN (World Wide Name) is usually used as this SAS address.

In this embodiment, the SAS address and the SAS expander 110 connected to the PHY indicated by the SAS address are associated with a valid bit, so that they are managed by a device management table 1340. The device management table 1340 is stored in the memory 134.

The device management table 1340 is composed of a device ID field 1341, a SAS address field 1342, and a valid field 1343 as shown in FIG. 6. The device ID field 1341 stores a logical identification number assigned to each SAS expander 110. The SAS address field 1342 stores the above-described SAS address. The valid field 1343 stores a valid bit indicating whether the SAS expander 110 or the storage device 120 corresponding to the SAS address stored in the SAS address field 1342 is available or not. The valid bit is indicated as either 0 or 1. The valid bit 0 indicates that the SAS expander 110 is unavailable; and the valid bit 1 indicates that the SAS expander 110 is available.

Figure 7:
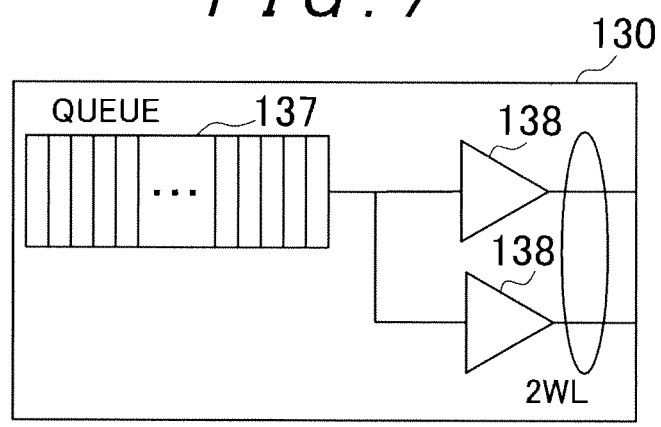
FIG. 7 is a conceptual diagram showing a queue buffer for the SAS controller according to the embodiment.

Furthermore, a queue buffer in the SAS controller 130 is connected to two PHYs as shown in FIG. 7. The PHY herein used means a communication modem part including, for example, SerDes (Serializer/DeSerializer: serial-parallel conversion circuit). Each PHY is connected to the SAS expander 110 which is a target device on a one-to-one basis. So, when a failure occurs in the storage media 120, commands to the storage media 120 where the failure occurred are not sent from the queue buffer and commands to normal storage media 120, which are to be processed after the above-mentioned commands enter a processing wait state.

(3-2) Configuration of SAS Expander

Figure 8:
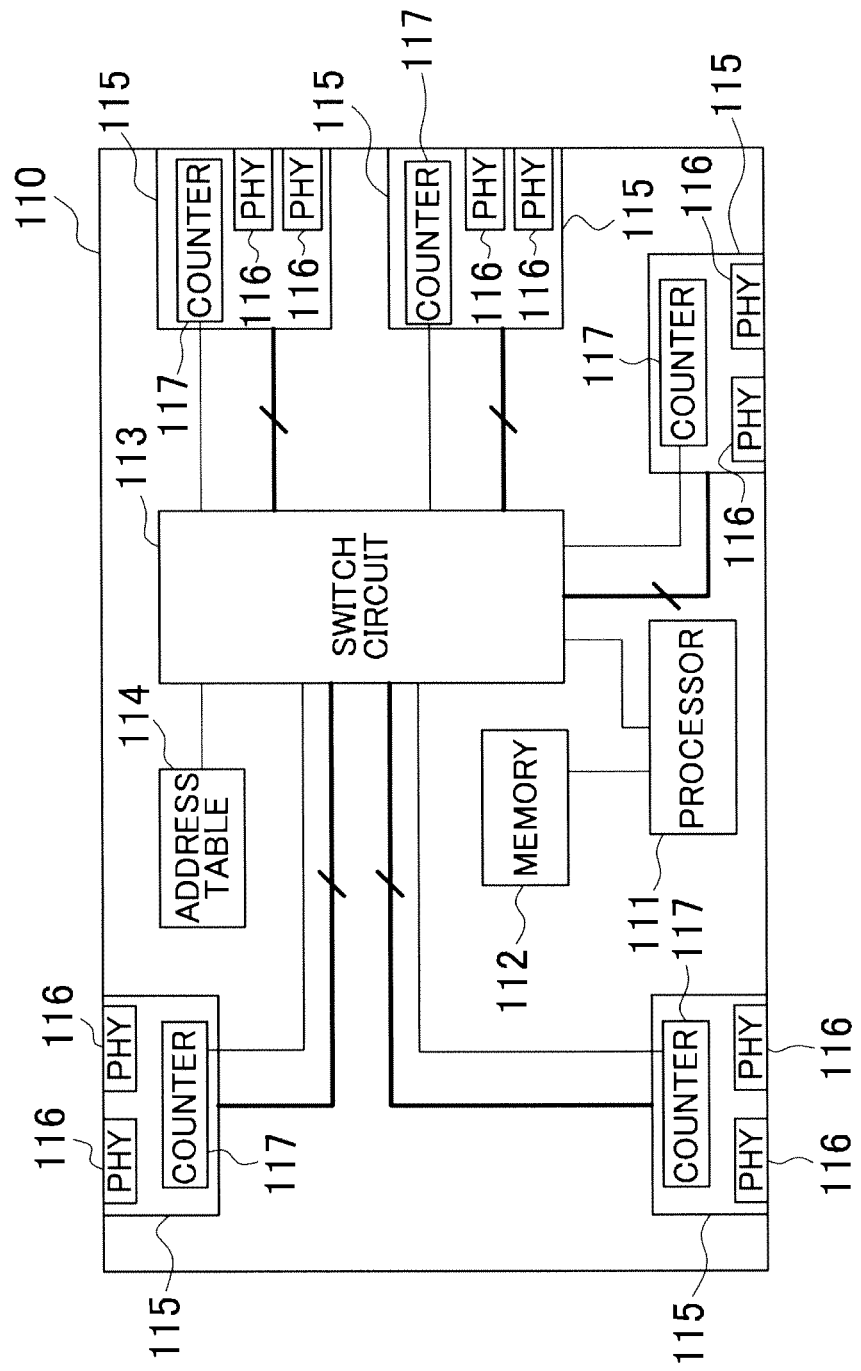
FIG. 8 is a block diagram showing the configuration of a SAS expander according to the embodiment.

Next, the configuration of the SAS expander 110 will be explained. The SAS expander 110 includes a processor 111, a memory 112, a switch circuit 113, an address table 114, and a device interface 115 as shown in FIG. 8.

The processor 111 has a function controlling the entire SAS expander 110, activates control programs stored in the memory 112, and controls each part in the SAS expander 110. For example, the processor 111 interprets a command sent from the SAS controller 130 and sends an instruction corresponding to the command to each storage media 120. The memory 112 is used to retain the control programs and control information.

Examples of the control programs stored in the memory 112 include a program for controlling the entire SAS expander 110, a program for monitoring, for example, I/O to/from the PHY 116 for the device interface 115, and a program for processing commands sent from the SAS controller 130. Also, examples of the control information stored in the memory 112 include information about the status of connection with the SAS controller 130 and the status of connection with the storage media 120. Furthermore, besides data, commands for notifying the SAS controller 130 of the status of the storage media 120 are stored in the memory 112 according to this embodiment.

Figure 9:
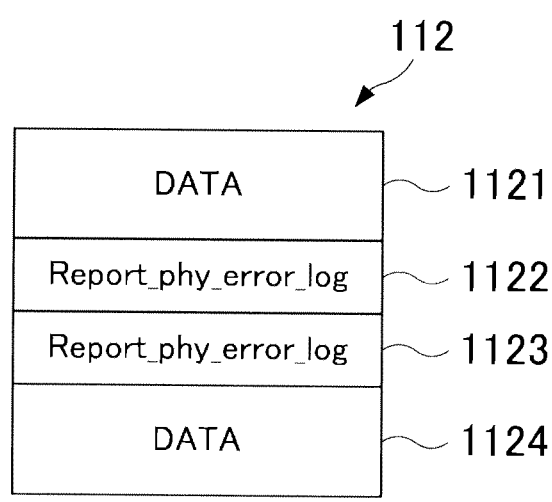
FIG. 9 is a conceptual diagram showing the content of a memory for the SAS expander according to the embodiment.

The memory 112 stores, besides data 1121 and data 1124, Report_phy_error_log which is a command to the storage media 120 connected to the SAS expander 110 as shown in FIG. 9. This command is to have the SAS expander 110 collect error information about all the PHYs 116 for the SAS expander 110. The PHYs 116 will be explained later in detail. Specifically, the SAS expander 110 monitors the connection status of the PHYs 116 for the SAS expander 110; and if a link failure occurs, the SAS expander 110 counts errors. Then, the SAS expander 110 executes the Report_phy_error_log command and returns an error value counted for each PHY 116 to the SAS controller 130.

The switch circuit 113 controls data transfer between the SAS expanders 110 and the storage media 120, which are directly connected to the plurality of SAS expanders 110, under control of the processor 111. Specifically speaking, the switch circuit 113 performs switching control of the PHYs (referred to as PHY in the drawing) 116 for the device interface 115.

The device interface 115 includes a plurality of PHYs 116 and a counter 117. The PHY 116 is connected to a PHY for the SAS controller 130 or a PHY for the storage media 120 and has a function sending or receiving data. The counter 117 has a function counting errors such as a physical failure occurring in the PHY 116. For example, if an error occurs in the storage media 120, an error value is added; and if the error value becomes equal to or more than a specified threshold value, the PHY 116 connected to the storage media 120 may be blocked.

Furthermore, a SAS address is assigned to each PHY 116 and the SAS address is associated with a valid bit of another SAS expander or the storage media 120 connected to the PHY 116 indicated by the SAS address, so that they are managed by an address table 114. Referring to FIG. 8, the address table 114 is stored in a storage unit which is not the memory 112; however, the invention is not limited to such an example and the address table 114 may be stored in the memory 112.

The address table 114 is composed of a PHY number 1141, a SAS address 1142, and a valid field 1143 as shown in FIG. 10. The PHY number 1141 stores a logical identification number assigned to a SAS expander immediately following the SAS expander 110 and a plurality of PHYs 116 in the SAS expander 110. The SAS address field 1142 stores the SAS address assigned to each PHY 116. The valid field 1143 stores a valid bit indicating whether the storage media 120 corresponding to the SAS address stored in the SAS address field 1142 is available or not. The valid bit is indicated as either 0 or 1. The valid bit 0 indicates that the storage media 120 is unavailable; and the valid bit 1 indicates that the storage media 120 is available. For example, if a link failure occurs in the immediately following SAS expander or a failure occurs in the storage media 120, the valid bit becomes 0 and, therefore, the address table 114 will be changed.

(4) Detailed Operation of Storage Apparatus

Next, the detailed operation of the storage apparatus according to this embodiment will be explained. Particularly, failure detection processing executed by the microprocessor 105, the SAS controller 130, and the SAS expander 110 will be explained below in detail. The failure detection processing, normal I/O processing, and so on are executed by the microprogram of the microprocessor 105 and various programs stored in the memory 134 for the SAS controller 130 and the memory 112 for the SAS expander 110 as described above. A processing subject of various processing will be hereinafter explained as a program or each part constituting the program; however, it is a matter of course that the microprocessor 105, the SAS controller 130, and the SAS expander 110 execute the processing according to the program and similar.

(4-1) Failure Detection Processing

Figure 11:
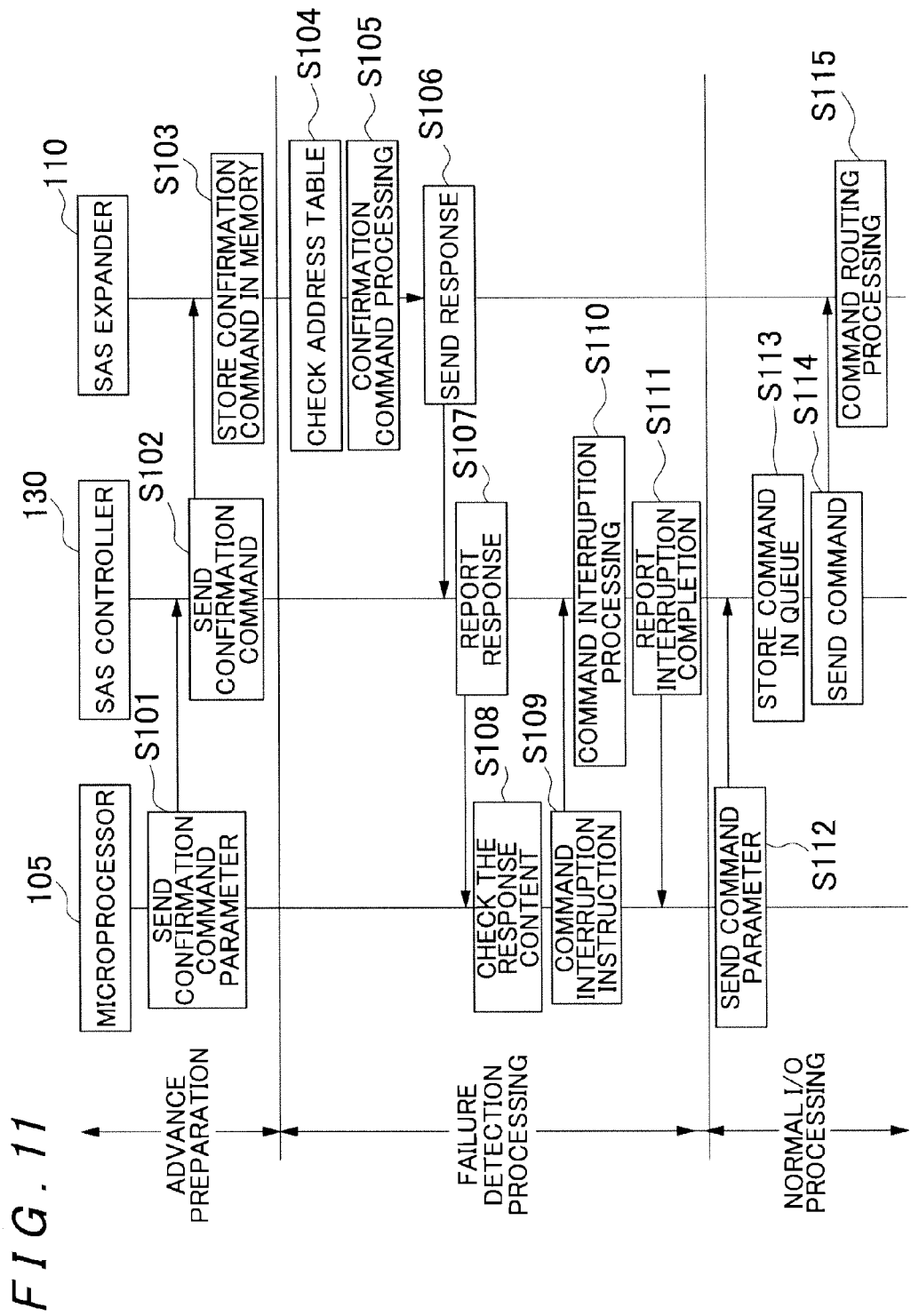
FIG. 11 is a sequence diagram illustrating failure detection processing according to the embodiment.

The failure detection processing according to this embodiment as shown in FIG. 11 is constituted from: advance preparation processing for sending the confirmation command (discover command) for identifying at which location a link failure occurred, to each SAS expander 110 in advance when the storage apparatus 10 is powered on and failure detection processing for detecting a link failure at the time of the occurrence of the link failure and interrupting command processing on the storage media 120 where the link failure occurred.

Firstly, the advance preparation processing will be explained. The microprocessor 105 for the storage apparatus 10 sends a command parameter regarding the confirmation command for identifying at which location the link failure occurred, to the SAS controller 130 as shown in FIG. 11 (S101). The command parameter herein used means an argument or variable for having the SAS controller 130 generate the confirmation command.

In step S101, the SAS controller 130 to which the confirmation command parameter was sent from the microprocessor 105 generates a confirmation command corresponding to the confirmation command parameter and sends the confirmation command to the SAS expander 110 (S102).

Figure 12:
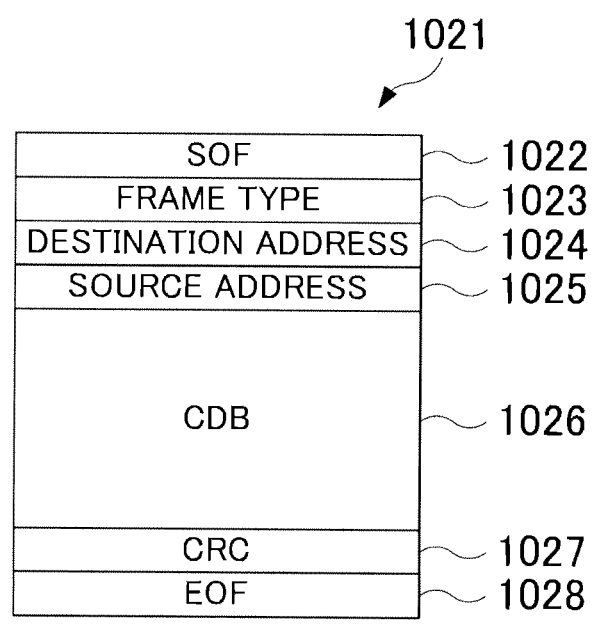
FIG. 12 is a conceptual diagram showing the content of a transfer frame according to the embodiment.

Now, a transfer frame of the confirmation command sent from the SAS controller 130 in step S102 will be explained. A transfer frame 1021 of the confirmation command is composed of an SOF (Start Of Frame) 1022, a frame type 1023, a destination address 1024, a source address 1025, a CDB (Command Descriptor Block) 1026, a CRC (Cyclic Redundancy Check) 1027, and an EOF (End Of Frame) 1028 as shown in FIG. 12. The SOF 1022 stores information of a starting part of the transfer frame 1021. The frame type 1023 stores frame information of the transfer frame. The destination address 1024 stores the address of a target device which is a transmission target of the transfer frame. The source address 1025 stores the address of a sender of the command. The CDB 1026 stores command information. In step S102, the information of the confirmation command is stored in the CDB 1026. The CRC 1027 stores information of an error check code. The EOF 1028 stores information of an end part of the transfer frame 1021.

Referring back to FIG. 11, the SAS expander 110 to which the confirmation command was sent from the SAS controller 130 in step S102 stores the confirmation command in the memory 112 (S103). Now, processing executed by the SAS controller 130 for storing the confirmation command in the memory 112 in step S103 will be explained. As the confirmation command is sent to the SAS expander 110 at the time of power-on of the storage apparatus 10 as described above, the SAS expander 110 needs to judge whether that command is a command to be processed or a command to be stored in the memory 112. So, in this embodiment, a value for judging whether the command is a command to be stored or not is stored in a register (not shown in the drawing) for the SAS expander 110 before the SAS controller 130 which is to transfer the command transfers the command.

Figure 13:
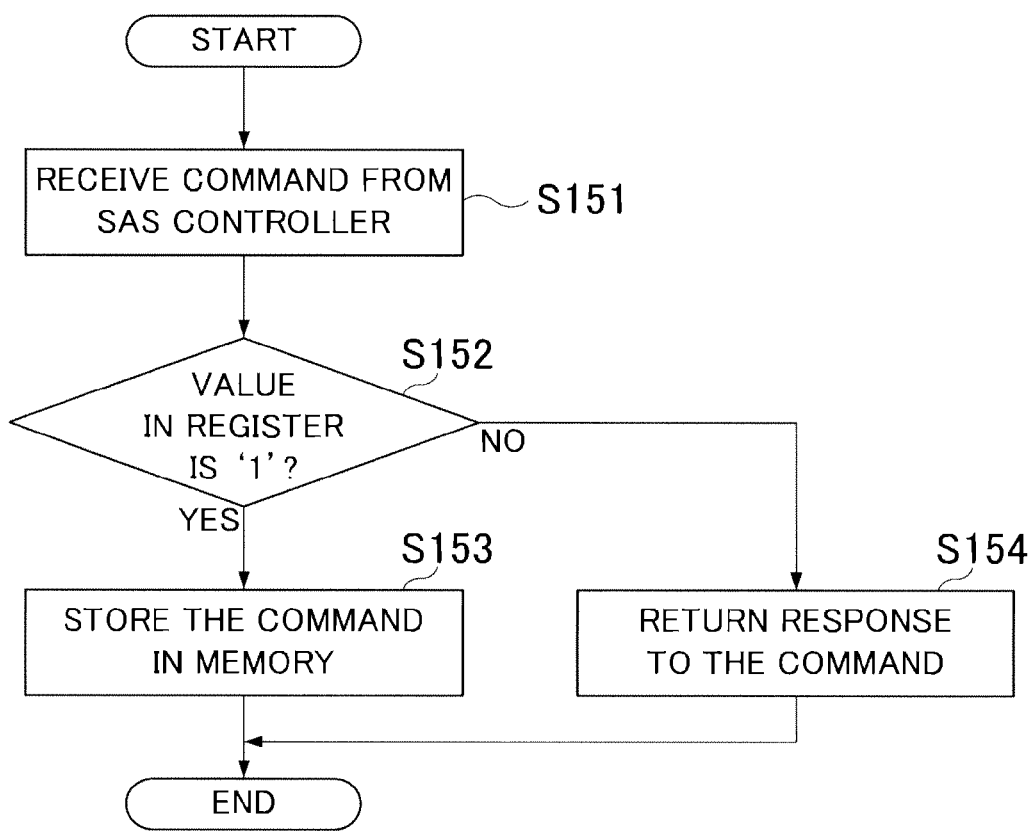
FIG. 13 is a flowchart illustrating a processing sequence for command storage processing according to the embodiment.

Now, the command storage processing executed by the SAS expander 110 will be explained. Before sending the confirmation command as described above, the SAS controller 130 writes 1 to the register of the SAS expander 110. The SAS expander 110 receives the command from the SAS controller 130 as shown in FIG. 13 (S151). The SAS expander 110 then judges whether the value of the register is 1 or not (S152).

If it is determined in step S152 that the value of the register is 1, the SAS expander 110 stores the command, which was received in step S151, in the memory 112 (S153). On the other hand, if it is determined in step S152 that the value of the register is not 1, the SAS expander 110 returns a response to the command received in step S151 to the SAS controller 130 (S154).

In this way, the confirmation command for identifying at which location the link failure occurred is stored in each SAS expander 110 by the advance preparation processing from step S101 to step S103 when the storage apparatus 10 is powered on.

Next, the failure detection processing will be explained. As shown in FIG. 11, the SAS expander 110 firstly checks the address table 114 (S104). Now, the details of the address table check processing in step S104 will be explained.

Figure 14:
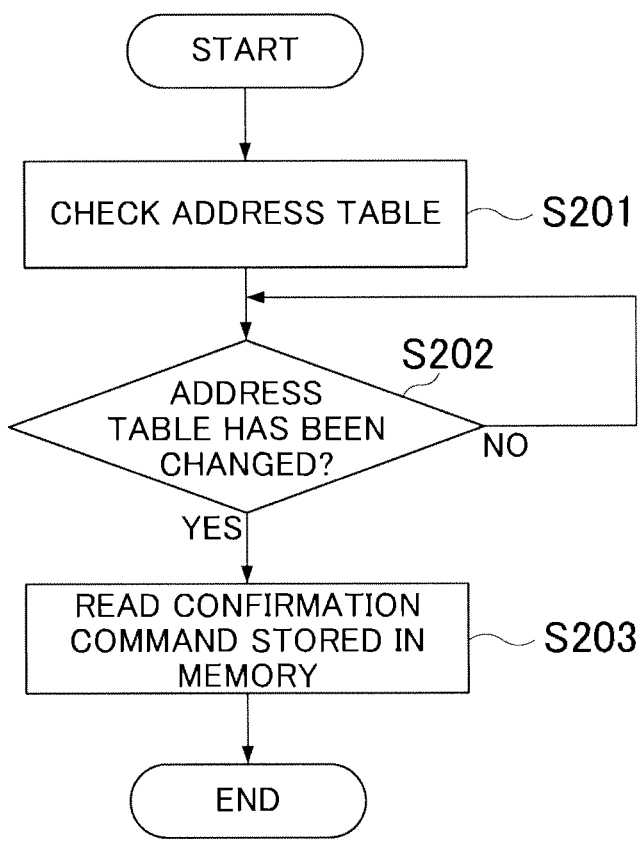
FIG. 14 is flowchart illustrating a processing sequence for address table check processing according to the embodiment.

The SAS expander 110 firstly checks the address table 114 as shown in FIG. 14 (S201). The SAS expander 110 may check the address table 114 in step S201 in a specified cycle, for example, a 100 microsecond cycle.

Then, the SAS expander 110 judges whether the address table 114 has been changed or not (S202). The address table 114 stores the status of the plurality of PHYs in the SAS expander 110 as described above. The SAS expander 110 judges whether the address table 114 has been changed or not, by comparing the information of the address table 114 checked in step S201 with the address table 114 before the check processing in step S201.

If a link failure or similar occurs in a SAS expander immediately following and connected to the SAS expander 110 or a failure occurs in the storage media 120 as described above, the valid bit of the SAS address corresponding to the PHY connected to the SAS expander or the storage media 120 immediately following the SAS expander 110 is changed from 1 to 0. The SAS expander 110 judges whether the valid bit has been changed or not, by comparing the address table 114 before and after the update.

If the SAS expander 110 determines in step S202 that the address table 114 has been changed, it reads the confirmation command stored in the memory in step S103 (S203). For example, if the valid bit of the SAS address corresponding to the immediately following SAS expander, from among the information stored in the address table 114, is changed from 1 to 0, the SAS expander 110 may read the confirmation command. Also, if the valid bit of the SAS addresses corresponding to all the storage media 120, from among the information stored in the address table 114, is changed from 1 to 0, the SAS expander 110 may read the confirmation command. If the valid bit of the SAS addresses of the storage media 120 whose quantity is equal to or more than a specified threshold value is changed from 1 to 0, the SAS expander 110 may read the confirmation command.

Referring back to FIG. 11, the SAS expander 110 processes the confirmation command which has been read (S105). Specifically speaking, the SAS expander 110 generates a response frame including information to identify the location where the link failure occurred, in accordance with the confirmation command. Subsequently, the SAS expander 110 sends the response frame generated in step S105 to the SAS controller 130 (S106).

Figure 15:
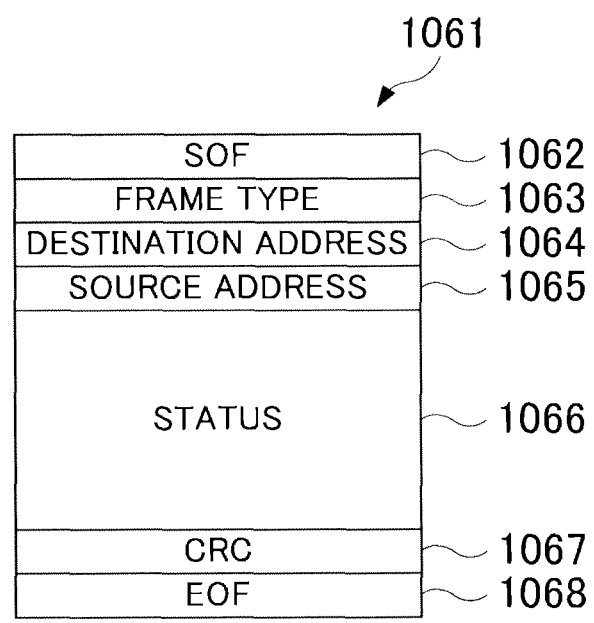
FIG. 15 is a conceptual diagram showing the content of a response frame according to the embodiment.

Now, the response frame sent from the SAS expander 110 in step S106 will be explained. A response frame 1061 is composed of an SOF (Start Of Frame) 1062, a frame type 1063, a destination address 1064, a source address 1065, a status 1066, a CRC (Cyclic Redundancy Check) 1067, and an EOF (End Of Frame) 1068 as shown in FIG. 15. The SOF 1062 stores information of a starting part of the response frame 1061. The frame type 1063 stores frame information of the response frame. The destination address 1064 stores the address of a target which is a transmission target of the response frame. The source address 1065 stores the address of a sender of the command. The status 1066 stores information indicating whether the confirmation command has terminated normally or not. If the confirmation command has not terminated normally, a value corresponding to the content of an error is stored. The value corresponding to the content of an error is, for example, a value indicating that the command has not been transmitted or the command cannot be transmitted. The CRC 1027 stores information of an error check code. The EOF 1028 stores information of an end part of the response frame 1061.

Referring back to FIG. 11, the SAS controller 130 to which the response was sent from the SAS expander 110 in step S106 reports the response to the microprocessor 105 (S107). Then, the microprocessor 105 which received the report about the response from the SAS controller 130 in step S107 checks the content of the response (S108). Subsequently, the microprocessor 105 executes command interruption processing based on the content of the response checked in step S108 (S109).

Figure 16:
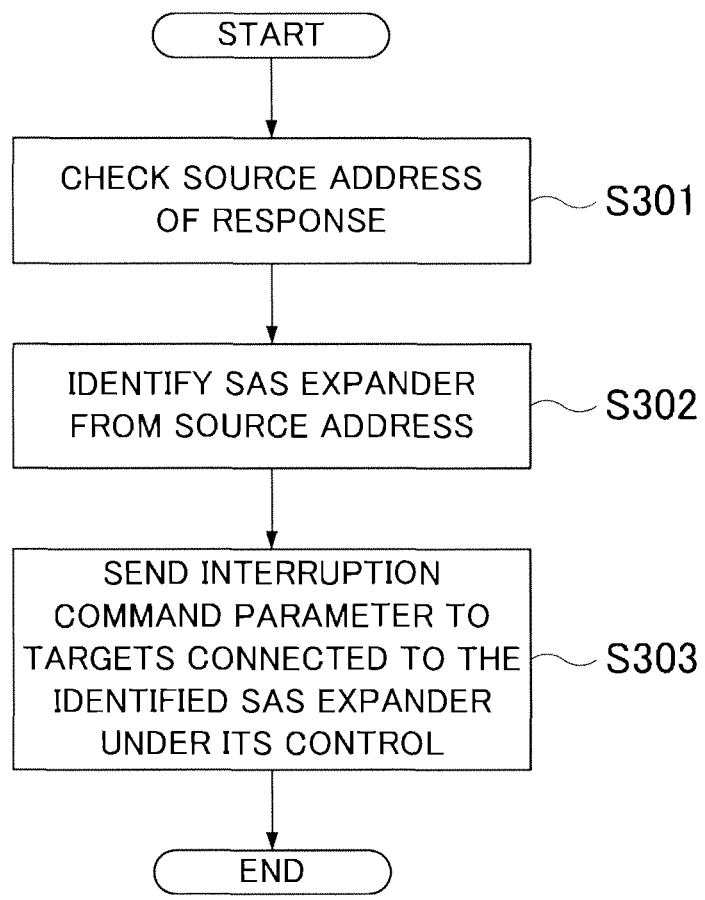
FIG. 16 is flowchart illustrating a processing sequence for command interruption processing according to the embodiment.

Now, the details of the response content check processing in step S108 and the command interruption processing in step S109 will be explained. The microprocessor 105 firstly checks the source address of the response as shown in FIG. 16 (S301).

The microprocessor 105 then identifies the SAS expander 110, which is a sender of the response, from the source address checked in step S301 (S302). The response frame stores the source address as described above. The microprocessor 105 checks the source address of the response frame and checks from which SAS expander 110 the response was transmitted.

Subsequently, the microprocessor 105 sends an interruption command parameter to target devices immediately following and connected to the SAS expander 110 identified in step S302 (S303). The target devices immediately following and connected to the SAS expander 110 herein mean the SAS expander and the storage devices 120 immediately following the SAS expander 110. Furthermore, the interruption command parameter sent in step S303 is information to delete a command(s) to the SAS expander 110 and the storage devices 120 where the failure occurred.

Referring back to FIG. 11, the SAS controller 130 to which the interruption command parameter was sent from the microprocessor 105 in step S109 executes the command interruption processing (S110). Specifically speaking, the SAS controller 130 deletes a command(s) to the storage media 120 under control of the SAS expander where the failure occurred, from among commands stored in the command queue in the SAS controller 130 based on the interruption command parameter sent from the microprocessor 105 in step S109.

Then, the SAS controller 130 reports to the microprocessor 105 that the command interruption processing has been completed (S111). If the SAS expander 110 detects a failure in a SAS expander immediately following the SAS expander 110 as a result of the failure detection processing in step S104 to step S111 described above, it reads the confirmation command, which was stored in the memory 112 in advance by the aforementioned advance preparation processing, from the memory 112 and sends a response to the confirmation command to the SAS controller 130. After receiving the response to the confirmation command from the SAS expander 110, the SAS controller 130 deletes a command(s) to the failure location in the command queue in accordance with an instruction from the microprocessor 105. In this embodiment, the confirmation command is stored in the memory 112 in the SAS expander 110 in advance as described above, thereby preventing the command(s) to the failure location in the command queue from being retained and also preventing any delay of transmission of the confirmation command stored in the command queue of the SAS controller 130.

(4-2) I/O Processing

Next, the normal I/O processing will be explained. If a link failure occurs in the SAS expander 110, the normal I/O processing is executed after execution of the processing in step S104 to step S111 described above.

The microprocessor 105 firstly sends a command parameter to the SAS controller 130 as shown in FIG. 11 (S112). The command parameter sent to the SAS controller 130 in step S112 is a parameter containing command information corresponding to an I/O request from the host system 20 and is information including a request to read data from, or write data to, the storage media 120.

Then, the SAS controller 130 to which the command parameter was sent in step S112 generates a command to the storage media 120 based on the command parameter and stores the command in the command queue (S113).

Subsequently, the SAS controller 130 sends the command, which was stored in the command queue in step S113, to the SAS expander 110 (S114). The command sent from the SAS controller 130 in step S114 is stored in the transfer frame shown in FIG. 12 and sent to the SAS expander 110. Specifically speaking, the transfer frame sent from the SAS controller 130 to the SAS expander 110 stores information such as the destination address of the SAS expander 110, which is a receiver of the command, the source address of the SAS controller 130, which is a sender of the command, and an I/O command.

The SAS expander 110 to which the command was sent from the SAS controller 130 in step S114 executes command routing processing (S115). Now, the command routing processing executed by the SAS expander 110 will be explained with reference to FIG. 17.

Figure 17:
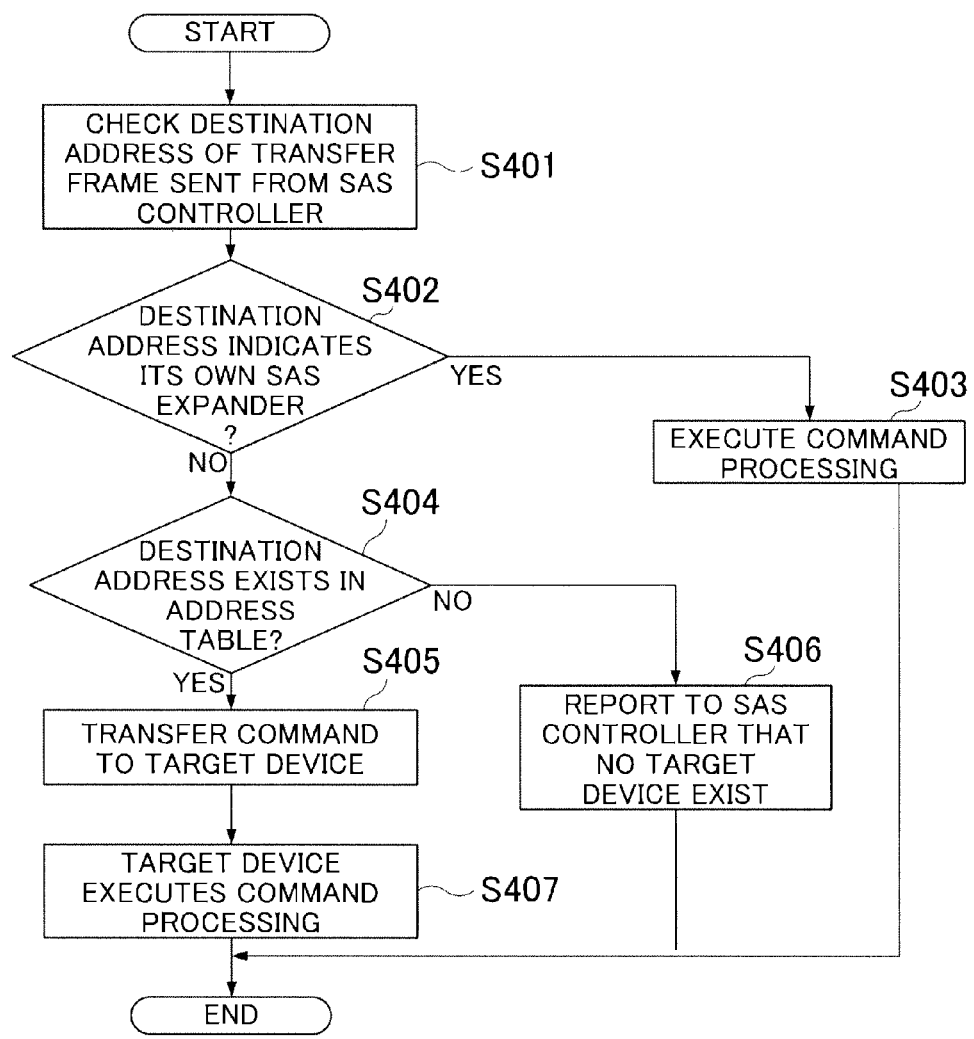
FIG. 17 is flowchart illustrating a processing sequence for command routing processing according to the embodiment.

The SAS expander 110 firstly checks the destination address included in the transfer frame sent from the SAS controller 130 as shown in FIG. 17 (S401).

Then, the SAS expander 110 judges whether the destination address checked in step S401 is the destination address indicative of the SAS expander 110 itself (S402).

If it is determined in step S402 that the destination address of the transfer frame is the destination address indicating the SAS expander itself, the SAS expander 110 executes processing corresponding to the command included in the transfer frame (S403).

On the other hand, if it is determined in step S402 that the destination address of the transfer frame is not the destination address indicating the SAS expander itself, the SAS expander 110 judges whether or not the destination address exists in the address table 114 of the SAS expander 110 (S404). The address table 114 stores a list of SAS addresses assigned to the PHYs 116 in the SAS expander 110 as described above. In step S404, the SAS expander 110 judges whether a SAS address identical to the destination address is stored or not, by comparing the destination address sent in step S402 with the SAS addresses stored in the address table 114.

If it is determined in step S404 that the destination address exists in the address table 114 of the SAS expander 110, the SAS expander 110 transfers the command to a target device corresponding to the destination address (the SAS expander and the storage devices 120 immediately following the SAS expander 110) (S405). Subsequently, the target device to which the command was transferred executes processing corresponding to that command (S407).

On the other hand, if it is determined in step S404 that the destination address does not exist in the address table 114 of the SAS expander 110, the SAS expander 110 notifies the SAS controller 130 that no relevant target device exists (S406).

If a link failure or similar occurs in the SAS expander 110 in this embodiment, the failure detection processing is executed before the normal I/O processing from step S112 to step S115 described above. As a result, it is possible to promptly cancel the command(s) to the storage media 120 where the failure occurred, and execute the normal I/O processing without delay.

(5) Advantageous Effect of this Embodiment

With the computer system 1 according to this embodiment as described above, the confirmation command for identifying at which location a link failure occurred is stored in each SAS expander 110 when the storage apparatus 10 is powered on. If the SAS expander 110 detects a failure in a SAS expander immediately following the SAS expander, it reads the confirmation command, which is stored in the memory 112 in advance, from the memory 112 and sends a response to the confirmation command to the SAS controller 130; and the SAS controller 130 deletes a command(s) to the failure location in the command queue based on the response. As a result, it is possible to reduce the length of time required to identify the location of a failure after the occurrence of the link failure in the SAS expander 110, promptly cancel a command(s) to the storage devices connected to the SAS expander 110 where the failure occurred, and prevent reduction of data processing capacity attributable to the failure occurrence.

(6) Other Embodiments

Incidentally, the aforementioned embodiment described the case where the present invention is applied to the storage apparatus 10 configured as shown in FIG. 3. However, the present invention is not limited to this example and can be applied to a wide variety of storage apparatuses having various other configurations.

Moreover, in the aforementioned embodiment, the confirmation command is stored in each SAS expander 110 in advance. However, the present invention is not limited to this example and the confirmation command may be stored only in the first or last SAS expander from among the SAS expanders connected in a tree structure topology.

Furthermore, in the aforementioned embodiment, a response is sent to the SAS controller 130 via the plurality of SAS expanders connected in the tree structure topology. However, when processing for sending/receiving other commands is executed on the SAS expanders, the execution of the response transmission processing may be prioritized.

The aforementioned embodiment described the case where the controller for controlling data input to, or output from, the storage media 120 is composed of the SAS controller 130, the plurality of expanders connected in the tree structure topology to the SAS controller 130 are composed of the SAS expanders 110, and the storage media 120 connected to their corresponding SAS expanders 110 are composed of SAS hard disk devices. However, the present invention is not limited to this example and devices other than the SAS controller, the SAS expanders, and the SAS hard disk devices may be used as the above-mentioned controller, expanders, and storage media.

Furthermore, the aforementioned embodiment described the case where the microprocessor 105 is used as the control unit for controlling the entire processing relating to the failure detection function and the normal I/O function according to this invention. However, the present invention is not limited to this example and hardware and software for executing the processing to be executed by such a control unit may be provided separately from the microprocessor 105. In this way, the same advantageous effect as that of the aforementioned embodiment can be obtained.

Furthermore, it is also possible to create a computer program for having hardware such as a CPU, ROM, and RAM contained in, for example, the storage apparatus 10 implement functions equivalent to those of each configuration of, for example, the aforementioned storage apparatus 10. Storage media storing that computer program is also provided.

INDUSTRIAL APPLICABILITY

The present invention can be applied to a storage system that utilizes the SAS.

REFERENCE SIGNS LIST

1 Computer system
10 Storage apparatus
100 Control unit
101 Channel
102 Data controller
103 Disk adapter
104 LAN interface
105 Microprocessor
106 Cache memory
110 SAS expander
114 Address table
130 SAS controller

The invention claimed is:

1. A storage apparatus comprising:
   expanders connected to storage media for storing data sent from a host system; and
   a controller configured to control the expanders;
   wherein
      the controller is configured to send a failure detection command to the expanders;
      each of the expanders comprises a respective storage unit and the expanders are configured to store the failure detection command in the respective storage units of the expanders; and
      when a first expander from among the expanders detects a failure in a second expander from among expanders immediately following and connected to the first expander, the first expander is configured to read the command stored in the storage unit in the first expander and to send a response including failure detection information corresponding to the command to the controller.

2. The storage apparatus according to claim 1, wherein the controller is configured to cancel a data input/output command from the host system to the storage media based on the failure detection information in the response sent by the first expander.

3. The storage apparatus according to claim 1, wherein the storage unit in the first expander is configured to store an address table for managing address information about the second expander and status information about the second expander by associating the managed address information with the status information; and wherein when the first expander detects a failure in the second expander, the first expander is configured to update the address table.

4. The storage apparatus according to claim 3, wherein when the address table is updated, the first expander is configured to read the command stored in the storage unit in the first expander and to send the response including the failure detection information corresponding to the command to the controller.

5. The storage apparatus according to claim 1, wherein the failure detection information corresponding to the command includes address information about the first expander, which sends the response including the failure detection information corresponding to the command.

6. The storage apparatus according to claim 5, wherein the controller is configured to identify the second expander in which the failure is detected, based on the address information included in the failure detection information sent by the first expander.

7. The storage apparatus according to claim 6, wherein the controller is configured to identify the second expander based on the address information included in the failure detection information sent by the first expander, to be a failure occurrence location.

8. The storage apparatus according to claim 6, wherein a storage unit for the controller is configured to store a device management table for managing address information about the expanders and status information about the expanders by associating the managing address information with the status information; and wherein the controller is configured to update status information of the first expander based on the address information included in the failure detection information sent by the expander.

9. A failure detection method using a storage apparatus including expanders connected to storage media for storing data sent from a host system, and a controller configured to control the expanders, the failure detection method comprising:
  a first step executed by the controller of sending a failure detection command to the expanders;
  a second step executed by the expanders, each of which comprises a respective storage unit, of storing the command in the respective storage units in the expanders;
  a third step executed by a first expander from among the expanders of reading the command stored in the storage unit of the first expander when the first expander detects a failure in a second expander from among expanders immediately following and connected to the first expander;
  a fourth step executed by the first expander of sending a response including failure detection information corresponding to the command to the controller; and
  a fifth step executed by the controller of cancelling a data input/output command from the host system to the storage media based on the failure detection information in the response sent by the first expander.

* * * * *